United States Patent [19]

Belart et al.

[11] Patent Number: 4,702,530
[45] Date of Patent: Oct. 27, 1987

[54] HYDRAULIC BRAKE SYSTEM WITH FAST-FILL CYLINDER

[75] Inventors: Juan Belart, Walldorf; Jochen Burgdorf, Offenbach-Rumpenheim; Wolfram Seibert, Darmstadt, all of Fed. Rep. of Germany

[73] Assignee: Alfred Teves GmbH, Frankfurt am Main, Fed. Rep. of Germany

[21] Appl. No.: 834,753

[22] Filed: Feb. 28, 1986

[30] Foreign Application Priority Data

Mar. 2, 1985 [DE] Fed. Rep. of Germany ....... 3507488
Mar. 2, 1985 [DE] Fed. Rep. of Germany ....... 3507484

[51] Int. Cl.⁴ .................. B60T 11/08; B60T 13/14; F15B 7/04; F15B 9/12
[52] U.S. Cl. .................................... 303/10; 60/547.1; 60/578; 60/582; 188/359; 303/52; 303/114; 303/119
[58] Field of Search .................... 303/50–56, 303/10–12, 114, 13, 14, 116, 119, 117, 92; 188/355–360, 347, 348, 351, 345, 352, 151 A; 60/576, 591, 574, 545, 575, 562, 577, 579, 578, 549, 550, 582, 584, 553, 547.1, 547.2, 551

[56] References Cited

U.S. PATENT DOCUMENTS

| | | | |
|---|---|---|---|
| 3,222,868 | 12/1965 | Stelzer | 188/347 X |
| 4,050,251 | 9/1977 | Carre et al. | 60/550 |
| 4,225,022 | 9/1980 | Belart | 188/347 X |
| 4,244,185 | 1/1981 | Belart | 60/576 X |
| 4,254,624 | 3/1981 | Gaiser | 60/574 |
| 4,416,491 | 11/1983 | Belart et al. | 303/52 X |
| 4,419,862 | 12/1983 | Farr | 60/576 X |
| 4,441,320 | 4/1984 | Gaiser | 60/578 |
| 4,492,413 | 1/1985 | Belart et al. | 303/114 X |
| 4,499,729 | 2/1985 | Gaiser | 60/578 |
| 4,523,792 | 6/1985 | Belart et al. | 303/92 |

FOREIGN PATENT DOCUMENTS

| | | | |
|---|---|---|---|
| 2705467 | 8/1978 | Fed. Rep. of Germany | 303/114 |
| 2723734 | 12/1978 | Fed. Rep. of Germany | 303/114 |
| 3215954 | 11/1983 | Fed. Rep. of Germany | 60/547.1 |

*Primary Examiner*—Douglas C. Butler
*Attorney, Agent, or Firm*—James B. Raden; Robert P. Seitter

[57] ABSTRACT

A hydraulic brake system (FIG. 2) composed of a master cylinder (30) coupled to the brake pedal (46), wherein there is provided a hydraulic booster (31) with a booster piston (91) and a booster chamber (35), and an auxiliary pressure proportional to the pedal force (F) develops in the booster chamber (35) during braking by way of a brake valve (6) actuated by the brake pedal (46). With the booster (31) intact, the auxiliary pressure prevailing in the booster chamber (35) acts by way of a pressure line (85, 87) on the two-stage piston (20) of a fast-fill cylinder (18), whose small stage (95) is immersed into a filling chamber (22) and, during the brake action, presses the pressure fluid available in the filling chamber (22) by way of pressure line (33) into the one brake line (37) connected to the working chamber (34) of the master cylinder (30). When the booster fails, the two-stage piston (20) of the fast-fill cylinder (18) remains in its initial position so that the piston (92) of the master cylinder (30) merely brings about pressure build-up in the two brake circuits (36, 37). The piston is moved by the brake pedal (46) by way of the actuating rod (11) and the piston rod (8).

3 Claims, 3 Drawing Figures

HYDRAULIC BRAKE SYSTEM WITH FAST-FILL CYLINDER

BACKGROUND OF THE INVENTION

This invention relates to a hydraulic brake system composed of a pedal-actuated brake power booster connected with the master cylinder. The system comprises a booster piston and a booster chamber wherein an auxiliary pressure proportional to the pedal force develops, and further comprising an auxiliary-pressure supply system and wheel brakes connected to the master cylinder.

A device having the above features is disclosed in German printed and published patent application No. 31 08 908.9. In the disclosed brake power booster, a master cylinder piston is located in a first cylinder bore, forming one component part with a booster piston. A master cylinder piston and booster piston are interconnected by way of a tappet. An end surface of the booster piston close to the pedal confines a booster chamber formed in the housing and is disposed coaxially to a pedal-actuatable piston rod, at which, in turn, there is articulated a lever assembly for the actuation of a brake valve. By application of force on the piston rod and by actuation of the brake valve, it is possible to introduce a pressure proportional to the actuating force into the booster chamber, with the pressure displacing the booster piston and the master cylinder piston connected to the booster piston in the direction of actuation of the power booster, whereby a corresponding pressure is built up in the working chamber of the master cylinder. Connected to the working chamber of the master cylinder are wheel brakes which are thereby pressurized wherein the vehicle slows down correspondingly. On pressurization of the booster chamber, the piston rod coupled to the brake pedal is likewise applied by pressure, so that a corresponding reaction force can be felt at the pedal providing the vehicle driver with feedback regarding the intensity of braking initiated by him.

Vehicles having a high permissible overall weight need a high boosting factor so as to keep the pedal force and the pedal travel within desired limits. In the event of booster failure, the result is undesirably or even inadmissibly high pedal forces and short pedal travels. It is, therefore, an object of the present invention to provide a brake system of the type described which operates with a reduced effective master brake cylinder surface in the event of booster failure.

SUMMARY OF THE INVENTION

This object is achieved by the present invention using a fast-fill cylinder wherein in a stepped bore a two-stage piston is slidably supported and wherein a pressure chamber is provided in front of the large stage of the two-stage piston and a filling chamber is arranged in front of the small stage of the two-stage piston. A resilient element acts upon the two-stage piston in the direction of the pressure chamber, with the pressure chamber communicating by way of a connecting line with the booster chamber. The filling chamber is connected by way of a pressure line to the working chamber of the master cylinder and/or to the brake lines. In order to be able to ascertain whether full functionability of the brake power booster is achieved, the two-stage piston cooperates with a feeler which is held and guided in the housing of the fast-fill cylinder and which is part of an electric switch that is inserted into the electric circuit of an alarm device or a brake-slip monitoring and controlling electronics.

In a slip-controlled brake system, the brake lines contain multidirectional valves which, in a first switching position, enable the pressure fluid to flow from the working chambers of the master cylinder into the wheel cylinders of the wheel brakes and, in a second switching position, shut off the passage of the pressure fluid from the working chambers to the wheel brakes. The valves permit fluid return from the wheel brakes to the working chambers. To this effect, change-over of the multidirectional valves typically takes place by way of a slip-monitoring electronics, for which purpose the directional valves are designed as electrically actuated valves.

Preferably, the annular chamber formed by the two stages of the two-stage piston and the and the stepped bore of the fast-fill cylinder communicates by way of a pressure line with the booster chamber. The pressure line comprising a multidirectional valve working as inlet valve which connects the annular chamber to the supply reservoir in a second switching position. To enable the introduction of pressure fluid out of the fast-fill cylinder into the brake circuit, the annular chamber is connected by way of the pressure lines to the brake lines, while shut-off valves are inserted into the pressure lines. The filling chamber, which is formed by the small stage of the two-stage piston and the stepped bore of the fast-fill cylinder and which includes a resilient element that acts upon the two-stage piston, is connected with the one brake line by way of a pressure line.

In an alternative embodiment, a non-return valve is inserted into the connecting line interconnecting the booster chamber and the pressure chamber of the fast-fill cylinder, and the control slide of the brake valve cooperates with a valve body through which the brake valve is connected to the pressure chamber. Preferably, in this arrangement, a mechanically actuated multidirectional valve is interposed into the pressure fluid conduit connecting the valve chamber to the fast-fill cylinder. The actuating member of the valve is coupled to the control slide of the brake valve.

Advantageously, the valve body controlling the flow of the pressure fluid from the booster chamber to the pressure chamber of the fast-fill cylinder includes a valve member, for example a valve ball, at its end close to the control slide. The valve ball opens or closes the axial bore of the control slide which is slidable in a bore of the housing depending on the position thereof.

Expediently, the valve body controlling the flow of the pressure fluid is furnished with a valve bore corresponding with the connecting line connected to the fast-fill cylinder. The valve bore being in turn in communication by way of a valve channel with the valve chamber that is formed by the valve body, the control slide and the bore in conjunction, and with the valve bore communicating with the supply reservoir by way of a housing channel. In a favorable embodiment, the valve ball of the valve body is held coaxially in relation to the axial bore of the control slide supported longitudinally slidably in the housing, while the valve channel connecting the valve chamber with the valve bore of the valve body terminates into the valve chamber outside of the area of the valve ball.

An embodiment which is particularly space-saving and simplifies the manufacture includes a recess in the housing of the booster being flush with the bore of the control slide and includes a valve body which comprises a valve member and valve channels. The valve body is held in the recess and contains at least one valve bore extending transversely to the bore and corresponding with the valve channels. The valve bore is in communication with a housing channel that is connected to the pressure chamber by way of a connecting line.

BRIEF DESCRIPTION OF THE DRAWING:

The present invention will now be described in detail in conjunction with the accompanying drawing wherein.

DETAILED DESCRIPTION

Figure 1:
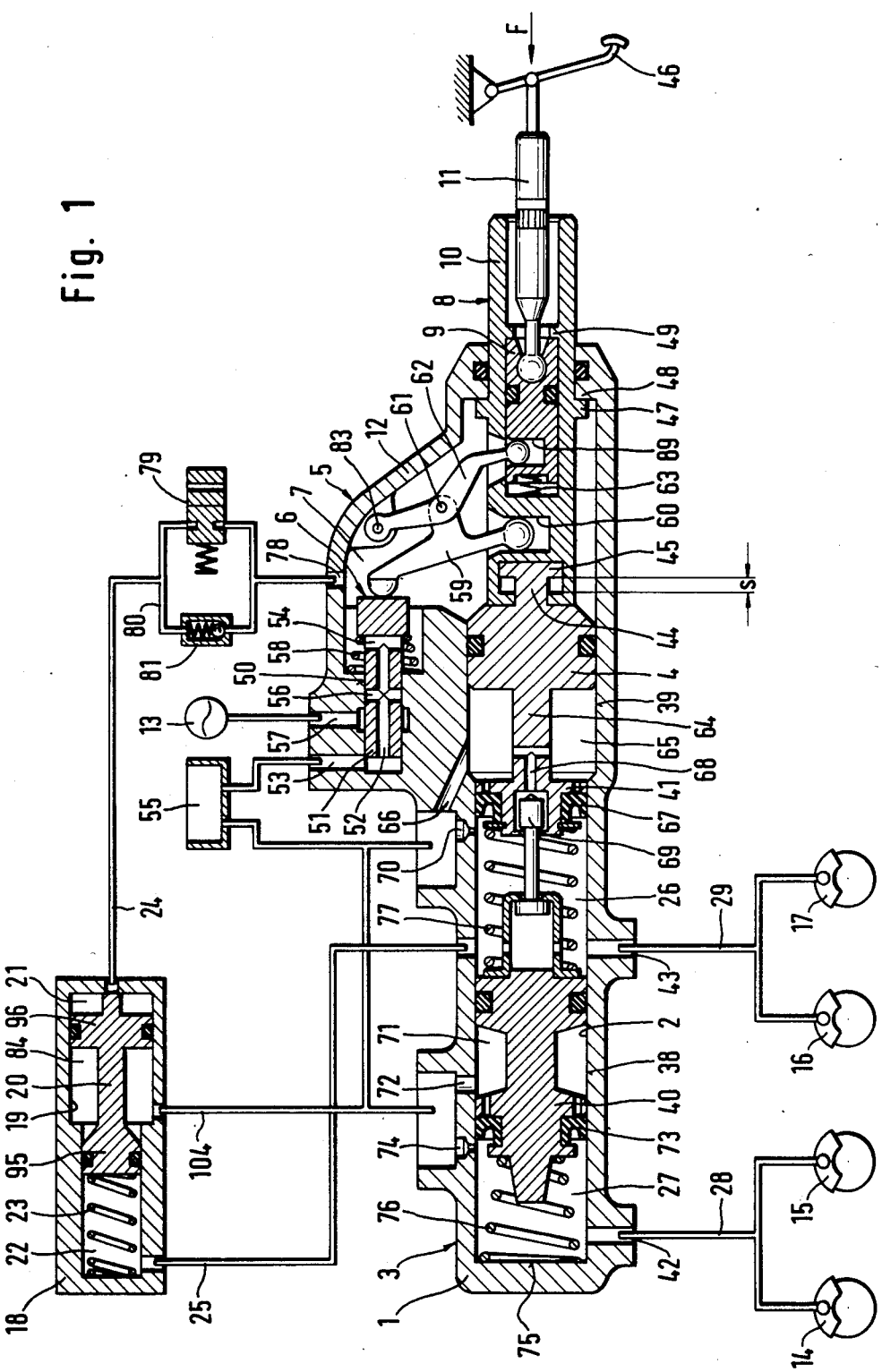
FIG. 1 is a diagram of a brake system in accordance with the present invention, with the master cylinder and the brake power booster being shown in longitudinal cross-section.

In FIG. 1, reference numeral 1 designates a housing accommodating a cylinder bore 2. Cylinder bore 2 includes a bore portion 38 of smaller diameter and of a bore portion 39 of enlarged diameter 39. Two master-cylinder pistons 40, 41 are sealedly guided in the bore portion 38 of smaller diameter, while in the bore portion 39 of enlarged diameter a booster piston 4 is sealedly guided which is coupled to the master-cylinder piston 41. Thus, two master-cylinder pistons 40, 41 are supported in the master cylinder 3, each of these master-cylinder pistons confining a working chamber 26, 27 which have connections with the wheel brakes 14, 15, 16, 17 of an automotive vehicle by way of housing ports 42, 43 and by way of corresponding brake lines 28, 29, the arrangement of the wheel brakes at the vehicle being optional in principle.

The end surface of the booster piston 4 close to the pedal carries an extension 44 which ends in an enlarged head 45 close to the pedal. Head 45 and, respectively, the extension 44 is supported with an axial play "s" in a sleeve 10 which is part of a piston rod 8 connected to a brake pedal 46. Sleeve 10 is equipped with an axially outwardly extending annular collar 47 which bears against a shoulder 48 of the housing 1 in the brake's release position to be gathered from the drawing. Inside the sleeve 10, a slide 9 is sealedly guided which is in communication with an actuating rod 11 directly coupled to the brake pedal 46. In the brake release position as seen in the drawing, the right-hand end of the slide 9 abuts on a step 49 of the sleeve 10 so that the brake release position of the power booster is defined specifically.

The housing of the brake power booster 5 furthermore contains a bore 50 in which the control slide 51 of a brake valve 6 is axially slidably supported. The control slide 51 is substantially of cylindrical design and comprises an axial bore 52, which, in the brake release position, establishes a hydraulic connection to an unpressurized supply reservoir 55 by way of a housing channel 53 and a radial bore 54. Thus, atmospheric pressure will prevail in a booster chamber 7 likewise in the brake release position of the hydraulic brake power booster. Furthermore, the control slide 51 includes a radial channel 56 through which, on corresponding displacement of the control slide 51, a housing channel 57 communicating with an auxiliary-pressure supply source 13 is connectible with the booster chamber 7. The control slide 51 is preloaded by a compression spring 58 in the direction of brake release.

Abutting on the end of the control slide 51, that is on the right hand when viewed in the drawing, is the end of a first lever 59 whose other end engages into a recess 60 of the sleeve 10. A second lever 62 is coupled to the first lever 59 by way of a rotary connection 61, the second lever being supported stationarily in the housing 1 with its upper end, when viewed in the drawing, while its lower end, when viewed in the drawing, engages into a recess 89 of the slide 9. Slide 9 is slidable axially in relation to the sleeve 10 in the brake-actuating direction, while a compression spring 63 is clamped in between the left end of the slide 9, when viewed in the drawing, and the sleeve 10.

The booster piston 4 is coupled to the master-cylinder piston 41 through a tappet 64. Between the tappet 64, the booster piston 4, the master-cylinder piston 41 and the housing 1, an annular chamber 65 is formed which is in permanent communication with the unpressurized supply reservoir 55 by way of a housing channel 66. The master-cylinder piston 41 is sealed by a sealing sleeve 67 and, in the brake release position illustrated, constitutes a connection to the working chamber 26 of the master cylinder 3 by way of a central bore 68 containing central valve 69, while a breathing 70 is arranged in the direction of actuation in front of the sealing sleeve 67 and interrupts a hydraulic connection between the unpressurized supply reservoir 55 and the working chamber 26 when the brake is applied. The master-cylinder piston 40 in conjunction with the housing 1 likewise encloses an annular chamber 71 which is in permanent communication with the unpressurized supply reservoir 55 by way of a housing channel 72. At the master-cylinder piston 40 a sealing sleeve 73 is also arranged through which a breathing bore 74 can be closed on displacement of the master-cylinder piston 40 so that the working chamber 27 of the master cylinder 3 is exposed to pressure. A first resetting spring 76 is clamped in between the bottom 75 of the cylinder bore 38 and the master-cylinder piston 40. Correspondingly, a second resetting spring 77 is placed between the two master-cylinder pistons 40, 41.

By way of a housing channel 78 and the connecting line 24, the booster chamber 7 is connected to the pressure chamber 21 of a fast-fill cylinder 18. Fast-fill cylinder 18 contains a stepped bore 19 in which a two-stage piston 20 is supported slidably in opposition to the force of a resilient element 23. The filling chamber 22 constituted by the small stage 95 of the stepped piston 20 and the left part of the fast fill cylinder 18 is by way of a pressure line 25 connected to the working chamber 26 of the master cylinder 3. Inserted into the connecting line 24 is a directional valve 79 which can be circumvented by a line 80 including a shut-off valve 81.

In the following, the mode of operation of the decribed brake system will be explained in more detail, the explanations starting from the brake release position, wherein all movable parts will have adopted the positions discernible from the drawing. The booster chamber 7 of the hydraulic power booster communicates with the unpressurized supply reservoir 55 by way of the control slide 51 and the housing channel 53. Thus, neither the piston rod 8, nor the booster piston 4 is acted upon by any force, and the wheel brakes 14, 15, 16, 17 connected to the master cylinder 3 are under atmospheric pressure.

With an actuating force F applied on the brake pedal 46, the slide 9 will displace against the force of the compression spring 63 to the left, whereby the second lever 62 performs a clockwise tilting movement around the stationary point of support 83 in the housing 1. Due to the seals sealing the booster piston 4 and the master-cylinder pistons 40, 41 as well as due to the resetting springs 76, 77 the lower end of the first lever 59, as seen in the drawing, will at first be counteracted by a relatively strong resistance. Thus, the upper end of the lever 59 will move the control slide 51 of the brake valve to the left so that the control slide 51 at first will close the housing channel 53 of the brake valve 6 and the booster chember 7 will be separated from the unpressurized supply reservoir 55. When the force at the brake pedal 46 is increased, the result of a continued displacement of the control slide 51 will be that the housing channel 57 will overlap with the radial channel 56 of the control slide 51. In consequence thereof, pressure fluid will flow from the pressure source 13 into the booster chamber 7 and will pressurize the slide 9 with its relative small effective surface, on the one hand, and will act on the booster piston 4, on the other hand. Thereby, the booster piston 4 will be displaced within the bore portion 39 to the left in the drawing and will perform a relative displacement in relation to the sleeve 10. During this phase of brake application, a relatively low reaction force will be felt at the brake pedal 46, said force resulting from the pressure prevailing in the booster chamber 7 and from the effective surface of the slide 9. In this contemplation, the action of the compression spring 63 may be neglected as the dimensioning of the compression spring 63 must only be such strong as to over come the friction of the seal between the slide 9 and the sleeve 10 in the brake release phase.

In the presence of a certain pressure level in the booster chamber 7 of the hydraulic power booster, the booster piston 4 overcoming friction will start to move with the master-cylinder piston 41 in the actuating direction so that a hydraulic pressure will develop in the working chamber 26 of the master cylinder 3 which will be supplied by way of corresponding brake lines 29 to the wheel brakes 16, 17. On the other hand, the pressure volume in the working chamber 26 of the master cylinder 3 will cause the master-cylinder piston 41 to displace in the direction of actuation, thus a hydraulic pressure likewise develops in the working chamber 27 of the master cylinder 3 and propagates to the wheel brakes 14, 15 by way of the brake line 28. When a second predeterminable pressure prevails in the booster chamber 7 of the hydraulic power booster 5, the booster piston 4 will have displaced in relation to the sleeve 10 by the axial play "S" so that further pressure increase in the working chambers 26, 27 of the master cylinder 3 will be possible only if there is an increase reaction force at the brake pedal 46, since now the entire surface is effective which is defined by the diameter of the sleeve 10. Consequently, the effect of an increase of the actuating force at the brake pedal 46 will be that a pressure is built up in the working chambers 26, 27 of the master cylinder 3 which corresponds to the pressure in the booster chamber 7 and which will become effective directly at the wheel brakes 14, 15, 16, 17 of the automotive vehicle.

When the brake is release, the described motional operations will reverse. At first, the sleeve 10 will be displaced together with the slide 9 in the brake release direction, while the head 45 formed fast with the booster piston 4 at first will stay abutted on the left end of the sleeve 10, when viewed in the drawing. Upon further pressure reduction in the booster chamber 7 of the hydraulic power booster, finally the annular collar 47 will come to abut on the shoulder 48 of the housing 1 so that the booster piston 4 will be caused by the resetting springs 76, 77 to travel the play s in the brake release direction until the head 45 will have moved with its right front surface into abutment on the sleeve 10 again.

Upon failure of the pressure source 13, the working chambers 26, 27 of the master cylinder 3 and, respectively, the wheel brakes 14, 15, 16, 17 connected to the working chambers 26, 27 can directly be pressurized by mechanical force application on the brake pedal 46, while the slide 9 first has to cover a lost travel in relation to the sleeve 10 until it abuts on said sleeve 10. By way of the sleeve 10, the master-cylinder piston 41 subsequently will be displaced mechanically in the direction of actuation. In doing so, first the working chamber 26, and then by way of the pressure volume established in the working chamber 26 of the master cylinder 3, the working chamber 27 will be pressurized in the manner described herein. Hence it follows that brake application is also possible upon the occurrence of failure of the pressure source 13. In this action, the play predetermined between the booster piston 4 and the sleeve 10 will not affect the pedal travel in any way.

The controlled pressure prevailing in the booster chamber 7 will also be supplied by way of the housing channel 78, the connecting line 24 and, respectively, the circumventive line 80 comprising shut-off valve 81 into the pressure chamber 21 of the fast-fill cylinder 18, the effective diameter of the large stage 96 of the two-stage piston 20 being dimensioned such that the two-stage piston 20 moves to the left in opposition to the force of the resilient element 23 and urges the pressure fluid prevailing in the filling chamber 22 by way of its small stage through the pressure line 25 into the working chamber 26. way of its small stage through the pressure line 25 into the working chamber 26. Accordingly, on brake actuation and with the unit intact, it is not only the pressure fluid prevailing in the two working chambers 26, 27 and displaced by the two master-cylinder pistons 40, 41 which is supplied into the brake lines 28, 29 but additionally also the pressure fluid prevailing in the filling chamber 22. However, in the event of the pressure in the booster chamber 7 dropping below a predetermined level (e.g., due to failure of the auxiliary-pressure supply source 13) then the two-stage piston 20 will remain in its right-hand initial position and the pressure fluid existing in the filling chamber 22 will not be available for a braking operation. The volume of the filling chamber 22, which is displaced by the two-stage piston 20, is rated such as to enable a change in transmission to be achieved by means of the fast-fill cylinder 18 which will have as a consequence that the master 3, when the booster system is intact, acts like a master cylinder having a larger effective piston diameter (e.g., of 24 mms), whereas, in the event of booster failure and of a correspondingly ineffective fast-fill cylinder 18, the same master cylinder 3 will act like a master cylinder with compartively smaller pistons (with, for example, a 20 mms piston diameter). The described change in transmission permits the driver of the vehicle still to effect a slowing-down after failure of the booster (while having to accept an increased pedal travel), even if the intact unit acts like a master cylinder with a larger-dimensioned piston.

Figure 2:
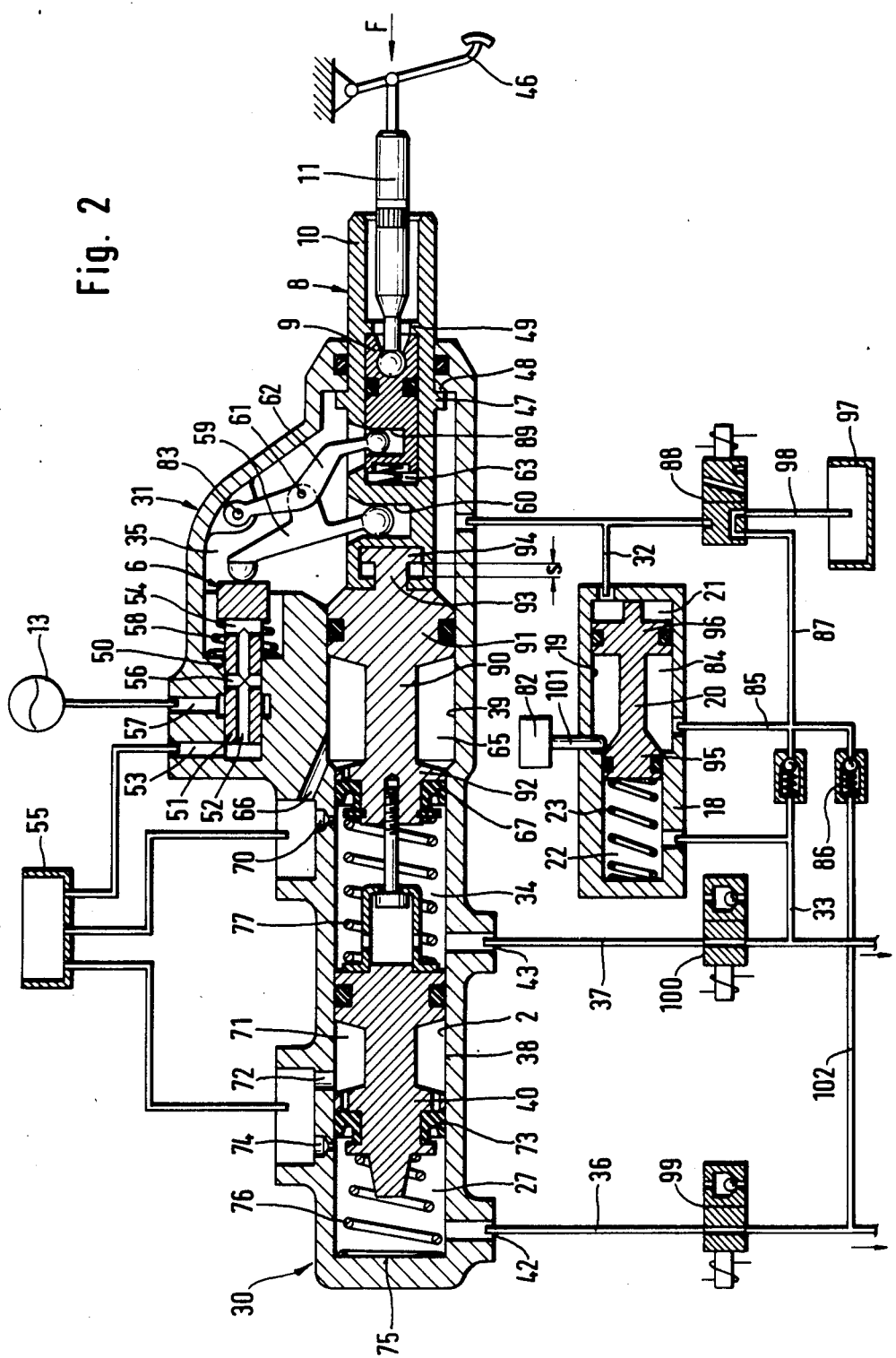
FIG. 2 is a diagram of a similar brake system which is adapted for use with slip-monitoring electronics; and, FIG. 3 is a wiring diagram of another brake system which can be used in conjunction with slip-monitoring electronics.

The brake system illustrated in FIG. 2 differs from that shown in FIG. 1 in particular in that the fast-fill cylinder 18 is not connected to the master cylinder, but directly to the brake line 37 by way of the pressure line 33. Moreover, the annular chamber 84 formed between the two stages 95, 96 of the two-stage piston 20 and the stepped bore 19 communicates by way of a pressure line 85 comprising shut-off valve 86 with the brake line 36, and by way of the pressure line 87 and the three-way/two-position directional valve (inlet valve) 88, with the booster chamber 35 of the brake power booster 31 so that, when the directional valve 88 assumes the position discernible from the drawing, the differential surface of the two stages 95, 96 of the stepped piston 20 is effective and the stepped piston 20 moves to the left in dependence on the pressure in the booster chamber 35. In the event of change-over of the directional valve (inlet valve) 88, the booster chamber 35 will be connected by way of the return line 98 with the unpressurized supply reservoir 97, while the pressure line 87 connected to the annular chamber 84 is shut off by the booster chamber 35 so that the stepped piston 20 moves to the right. The directional valves 99, 100 inserted into the brake lines 36, 37 as well as the directional valve (inlet valve) 88 can be actuated by a brake-slip monitoring and controlling electronics not illustrated in the more detail.

Reference numeral 82 in FIG. 2 refers to an electric switch which is actuatable by way of feeler 101 abutting on the small stage 95 of the two-stage piston 20, the switch is utilized to indicate the failure of the booster 31, since on booster failure the stepped piston 20 remains in its (right-hand) initial position when the brake pedal 46 is depressed and the actuating rod 11 is displaced.

In case that the unit illustrated is part of a brake system with slip control, upon an imminent locked condition of the vehicle wheels, the pressure fluid will flow from the auxiliary-pressure supply source 13 by way of the booster chamber 35, by way of the directional valve 88 and the pressure lines 33, 86, 87 into the brake lines 36, 37, for which purpose the directional valves 99, 100 are simultaneously switched to assume their closed position. The valves required to enable pressure reduction in the wheel brake cylinders and return flow of the pressure fluid into the supply reservoir 55 are not shown in greater detail in the drawing.

Figure 3:
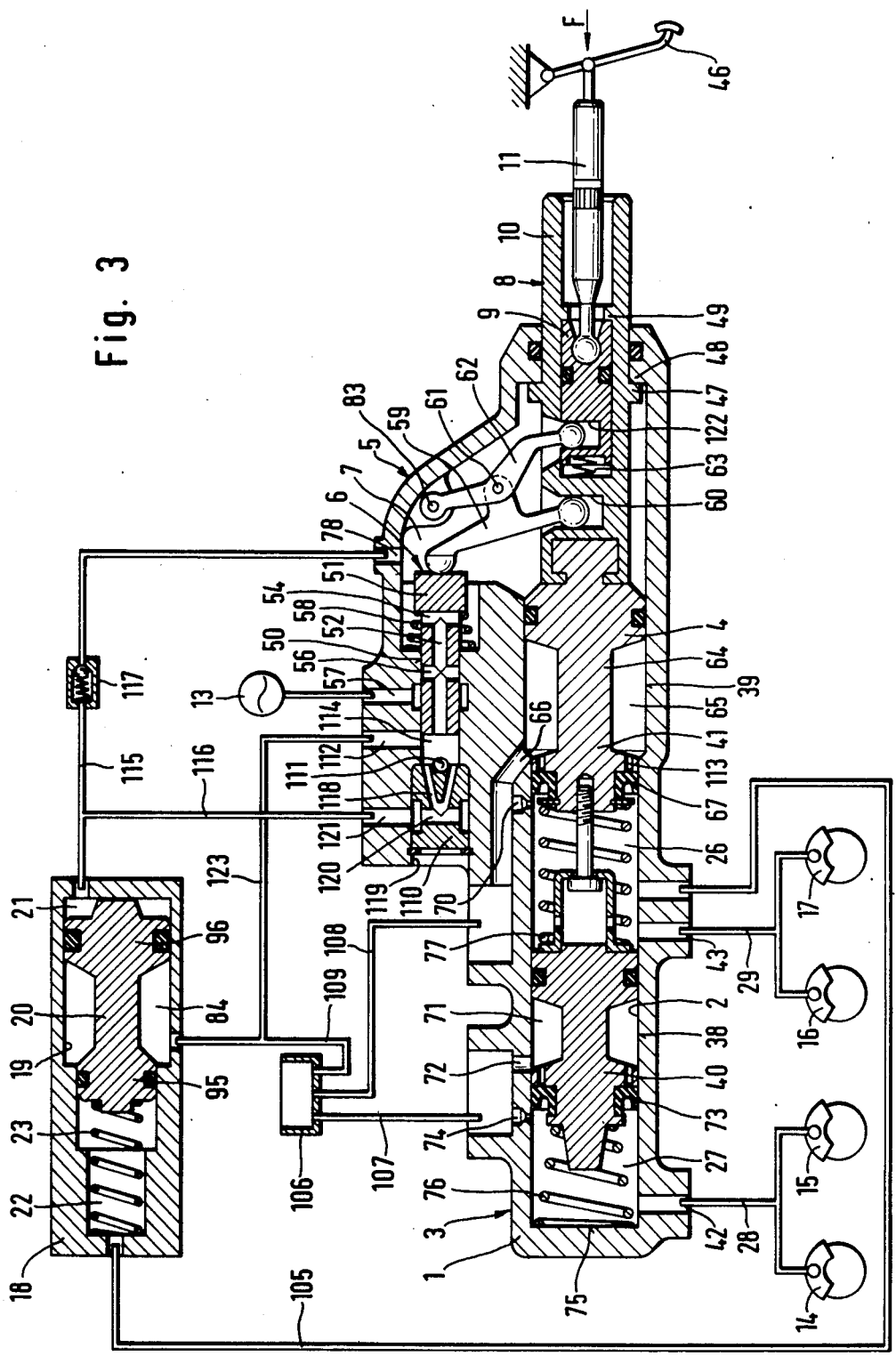

According to FIG. 3, the housing of the brake power booster 5 furthermore contains a bore 50 in which the control slide 51 of the brake valve 6 is axially slidably supported. The control slide 51 is substantially of cylindrical design and comprises an axial bore 52 which, in the brake release position, establishes a hydraulic connection to an unpressurized supply reservoir 10 by way of a housing channel 53 and a radial bore 54. Thus, atmospheric pressure will prevail in a booster chamber 7 likewise in the brake release position of the hydraulic brake power booster. Furthermore, the control slide 51 includes a radial channel 56 through which, on corresponding displacement of the control slide 51, a housing channel 57 communicating with a pressure supply source 13 is connectible with the booster chamber 7. The control slide 51 is preloaded by a compression spring 58 in the direction of brake release.

In front of the left end of the control slide 51, when viewed in the drawing, a valve chamber 114 is arranged which communicates with the supply reservoir 106 by way of a housing channel 112 and the return line 109. In the extension of the bore 50, a recess 119 is provided having the shape of a bore of enlarged diameter, in which the valve body 110 is held whose valve ball 111 cooperates with the axial bore 52 of the control slide 51. The valve body 110 contains valve channels 118 which connect the valve chamber 114 to the valve bore 120 and the housing channel 121.

Abutting on the end of the control slide 51 that is on the right hand (when viewed in the drawing according to FIG. 3) is the end of the first lever 59 whose other end engages into a recess 60 of the sleeve 10. The second lever 62 is coupled to the first lever 59 by way of a rotary connection 61, the second lever being supported stationary in the housing 1 with its upper end, when viewed in the drawing, while its lower end, when viewed in the drawing, engages into a recess 122 of the slide 9. Slide 9 is slidable axially in relation to the sleeve 10 in the brake-actuating direction, while a compression spring 63 is clamped is between the left end of the slide 9, when viewed in the drawing, and the sleeve 10.

The master-cylinder piston 41 is sealed by a sealing sleeve 67, and in the brake release position illustrated, constitutes a connection to the working chamber 26 of the master cylinder 3 by way of a bore 113, while besides a breathering bore 70 is arranged in the direction of actuation in front of the sealing sleeve 67 and interrupts a hydraulic connection between the unpressurized supply reservoir 106 and the working chamber 26 when the brake is applied. The master-cylinder piston 40 in conjunction with the housing 1 likewise encloses an annular chamber 71 which is in permanent communication with the unpressurized supply reservoir 55 by way of a housing channel 72. At the master-cylinder piston 40 a sealing sleeve 73 is also arranged through which a breathering bore 74 can be closed on displacement of the master-cylinder piston 40 so that the working chamber 27 of the master cylinder 3 is exposed to pressure. A first resetting spring 76 is clamped in between the bottom 75 of the cylinder bore 38 and the master-cylinder piston 40. Correspondingly, a second resetting spring 77 is placed between the two master-cylinder pistons 40, 41.

By way of a housing channel 121 and the connecting line 116, the booster chamber 7 is connected to the pressure chamber 21 of the fast-fill cylinder 18. The filling chamber 22 constituted by the small stage 95 of the stepped piston 20 and the left part of the fast-fill cylinder 18 is connected by way of pressure line 105 to the working chamber 26 or the working chamber 27 of the master cylinder 3.

In the following, the mode of operation of the brake system illustrated in FIG. 3 will be explained in more detail, the explanations starting from the brake release position, wherein all movable parts will have adopted the positions discernible from the drawing figure. The booster chamber 7 of the hydraulic power booster communicates with the unpressurized supply reservoir 106 by way of the control slide 51, the housing channel 112 and the return line 123. Thus, neither the piston rod 8, nor the booster piston 4 is acted upon by any force, and the wheel brakes 14, 15, 16, 17 connected to the master cylinder 3 are under atmospheric pressure.

With actuating force F applied on the brake pedal 46, the slide 9 will displace against the force of the compression spring 63 to the left, whereby the second lever 62 performs a clockwise tilting movement around the stationary point of support 83 in the housing 1. Due to the seals sealing the booster piston 4 and the master-cylinder piston 40, 41 as well as due to the resetting springs 76, 77, the lower end of the first lever 59, as seen in the drawing, will at first be counteracted by a relatively strong resistance. Thus, the upper end of the lever 59 will move the control slide 51 of the brake valve to the left so that the control slide 51 at first will close the housing channel 53 of the brake valve 6 and the booster chamber 7 will be separated from the unpressurized supply reservoir 106. When the force at the brake pedal 46 is increased, the result of a continued displacement of the control slide 51 will be that the housing channel 57 will overlap with the radial channel 56 of the control slide 51. In consequence thereof, pressure fluid will flow from the pressure source 13 into the booster chamber 7 and will pressurize the slide 9 with its relatively small effective surface, on the one hand, and will act on the booster piston 4, on the other hand.

In the presence of a certain pressure level in the booster chamber 7 of the hydraulic power booster, the booster piston 4, overcoming the friction, will start to move with the master-cylinder piston 41 in the actuating direction so that a hydraulic pressure will develop in the working chamber 26 of the master cylinder 3 which will be supplied by way of a corresponding brake line 29 to the wheel brakes 16, 17.

The controlled pressure prevailing in the booster chamber 7 when the booster is intact will also be supplied by way of the axial bore 52, the valve chamber 114, the valve body 110, the housing channel 121, the connecting line 116 into the pressure chamber 21 of the fast-fill cylinder 18, the effective diameter of the large stage 96 of the two-stage piston 20 being dimensioned such that the two-stage piston 20 moves to the left in opposition to the force of the resilient element 23 and urges the pressure fluid prevailing in the filling chamber 22 by way of the its small stage 95 through the pressure line 105 into the working chamber 26 so that, on brake actuation and with the unit intact, it is not only the pressure fluid prevailing in the two working chambers 26, 27 and displaced by the two master-cylinder pistons 40, 41 which is supplied into the brake lines 28, 29 but additionally also the pressure fluid prevailing in the filling chamber 22. Thereby, the pedal travel is reduced by the volume supplied from the filling chamber into the brake line. Simultaneously, there is also a pressure-fluid connection from the booster chamber 7 by way of the housing port 78 and the connecting line 115 and the non-return valve 117 to the pressure chamber 21 of the fast-fill cylinder 18.

In the event of the pressure in the booster chamber 7 dropping below a predetermined level due to failure of the pressure fluid source 13, then the two-stage piston 20 will remain in its right-hand initial position and the pressure fluid existing in the filling chamber 22 will not be available for a braking operation. The volume of the filling chamber 22, which volume is displaced by the two-stage piston 20, is rated such as to enable a change in transmission to be achieved by means of the fast-fill cylinder 18 with the result that the master cylinder 3, when the booster system is intact, acts like a master cylinder having a larger effective piston diameter (e.g., of 24 mms), whereas, in the event of booster failure and a corresponding, ineffective fast-fill cylinder 18, the same master cylinder 3 will act like a master cylinder with comparatively smaller pistons (with, for example, a 20 mms piston diameter). The described change in transmission permits the driver of the vehicle to still effect a slowing-down after failure of the booster, with a somewhat increased pedal travel.

To safeguard that, on failure of the booster 5 during a brake action, the pressure fluid displaced out of the filling chamber 22 into the working chamber 26 of the master cylinder 3 will not return into the filling chamber 22, on the open hand, a non-return valve 117 is inserted into the connecting line 115 interconnecting the booster chamber 7 and the pressure chamber 21 of the fast-fill cylinder 18. On the other hand, the connection leading by way of the connecting line 116, the housing channel 121, the valve bore 120, the valve chamber 114, the axial bore 52 and the radial bore 54 to the booster chamber 7 will be closed by the control slide 51 being moved by way be of the pair of levers 59, 62 to the left so far that the valve ball 111 closes the axial bore 52 and the control slide 51 itself closed the housing channel 112. As a result, the return line 109 isolated from the valve chamber 114.

What is claimed is:

1. A hydraulic brake system for use with automobiles having vehicle wheels and wheel brakes, said system comprising, in combination:

a pedal-actuated hydraulic pressure generator including a hydraulic brake booster having a brake booster housing forming a booster chamber therein, and said generator including a master cylinder having at least one working chamber therein in which a piston is slidably mounted and said generator including a piston rod slidably mounted therein for connecting the master cylinder to a brake pedal;

a first pressure fluid conduit connecting said working chamber to said wheel brakes;

an auxiliary-pressure supply source connected to an input port of said housing;

a brake valve mounted in said housing between said input port and said booster chamber and said brake valve being responsive to movement of said piston rod to provide a pressure fluid connection between said input port of said housing and said booster chamber;

a fast-fill cylinder having a stepped bore therein providing a filling chamber and a pressure chamber therein wherein the cross-sectional area of said pressure chamber is greater than the cross-sectional area of said filling chamber, and said fast-fill cylinder including a two-stage piston slidably mounted therein with the opposite ends of said two-stage piston having dimensions corresponding to the cross-sectional area of the filling and pressure chamber and said two-stage piston being resiliently urged toward said pressure chamber;

a second pressure fluid conduit connecting said filling chamber to said wheel brakes;

a third pressure fluid conduit connecting said pressure chamber to said booster chamber;

wherein during normal braking operation of said brake system the pressure supplied by said auxiliary-pressure source translates said two-stage piston toward said filling chamber thereby applying the resulting pressure in said filling chamber to said wheel brakes; and, wherein upon the pressure developed in said booster chamber falling below a predetermined pressure level, said two-stage piston is translated away from said filling chamber.

2. The brake system according to claim 1, wherein said second pressure line is connected to said working chamber whereby said second pressure line is connected to said wheel brakes through said working chamber.

3. The brake system according to claim 2, wherein said third pressure fluid conduit includes a unidirectional valve therein which allows pressure fluid flow from said booster chamber into said pressure chamber.

* * * * *